(12) United States Patent
Kikinis

(10) Patent No.: US 11,573,669 B2
(45) Date of Patent: *Feb. 7, 2023

(54) SYSTEM AND METHOD FOR SIMULATING HUMAN MANUAL INPUT FOR DEVICES USING CAPACITIVE TOUCHSCREENS

(71) Applicant: Future Dial, Inc., Sunnyvale, CA (US)

(72) Inventor: Dan Kikinis, Los Altos, CA (US)

(73) Assignee: Future Dial, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/168,927

(22) Filed: Feb. 5, 2021

(65) Prior Publication Data

US 2021/0157455 A1 May 27, 2021

Related U.S. Application Data

(63) Continuation of application No. 16/030,767, filed on Jul. 9, 2018, now Pat. No. 10,936,097, which is a
(Continued)

(51) Int. Cl.
*G06F 11/22* (2006.01)
*G06F 3/044* (2006.01)
(Continued)

(52) U.S. Cl.
CPC ......... *G06F 3/0446* (2019.05); *G01M 99/005* (2013.01); *G02F 1/1368* (2013.01);
(Continued)

(58) Field of Classification Search
CPC ...... G06F 3/044; G06F 3/0446; G06F 3/0412; G06F 3/0445; G06F 11/2221;
(Continued)

(56) References Cited

U.S. PATENT DOCUMENTS 10,019,092 B2 * 7/2018 Kikinis ................ G06F 3/0416
10,936,097 B2 * 3/2021 Kikinis ................ G06F 3/0412
(Continued)

FOREIGN PATENT DOCUMENTS

JP 2009290852 12/2009

OTHER PUBLICATIONS

Title: System and Method for Simulating Human Manual Input for Devices Using Capacitive Touchscreens, U.S. Appl. No. 15/374,936, filed Dec. 9, 2016, Inventor: Dan Kikinis, Status: Patented Case, Status Date: Jun. 20, 2018.
(Continued)

*Primary Examiner* — Robert R Raevis
(74) *Attorney, Agent, or Firm* — Greenberg Traurig

(57) ABSTRACT

Disclosed are systems, methods, and devices for simulating human manual input for devices using capacitive touchscreens. In one embodiment, the system comprises a test fixture, wherein the test fixture comprises a matrix of tubes, each tube being coated with a conductive coating; and a camera located under the matrix and configured to record the capacitive touchscreen of the device under test. The system further includes a tablet to receive images from the camera and display a visual representation of the capacitive touchscreen of the device under test, wherein the tablet is configured to receive a plurality of touch events; update the visual representation of the capacitive touchscreen of the device under test in response to the plurality of touch events; and generate a simulation of touch events, the simulation representing interaction with the device under test. The system further includes a workstation communicatively coupled to the tablet and configured to receive the simulation from the tablet device; and transmit the simulation to the test fixture to enable the execution of the simulation on one or more additional devices under test.

20 Claims, 8 Drawing Sheets

Related U.S. Application Data continuation of application No. 15/374,936, filed on Dec. 9, 2016, now Pat. No. 10,019,092.

(60) Provisional application No. 62/265,902, filed on Dec. 10, 2015.

(51) Int. Cl.
*G06F 3/041* (2006.01)
*G02F 1/1333* (2006.01)
*G02F 1/1368* (2006.01)
*H04N 5/232* (2006.01)
*G01M 99/00* (2011.01)

(52) U.S. Cl.
CPC .......... *G02F 1/13338* (2013.01); *G06F 3/044* (2013.01); *G06F 3/0412* (2013.01); *G06F 3/0416* (2013.01); *G06F 3/0445* (2019.05); *G06F 11/2221* (2013.01); *H04N 5/23293* (2013.01); *H04N 5/232933* (2018.08)

(58) Field of Classification Search
CPC .......... H04N 5/23293; H04N 5/232933; G02F 1/13338; G02F 1/1368; G01M 99/005; G01F 11/2221
USPC .......... 73/865.3, 865.6, 865.7, 865.9, 432.1; 400/180, 182, 472–474; 345/174, 904; 324/500, 511, 537, 750.1, 750.15, 750.17, 324/760, 1, 760.02, 762.02, 555
See application file for complete search history.

(56) References Cited

U.S. PATENT DOCUMENTS

| | | |
|---|---|---|
| 2012/0188176 A1 | 7/2012 | Uzelac et al. |
| 2015/0097803 A1 | 4/2015 | Leigh et al. |
| 2016/0301786 A1 | 10/2016 | Koltsov et al. |
| 2017/0168622 A1 | 6/2017 | Kikinis |
| 2018/0314373 A1 | 11/2018 | Kikinis |

OTHER PUBLICATIONS

Title: System and Method for Simulating Human Manual Input for Devices Using Capacitive Touchscreens, U.S. Appl. No. 16/030,767, filed Jul. 9, 2018, Inventor: Dan Kikinis, Status: Patented Case, Status Date: Feb. 10, 2021.

\* cited by examiner

SYSTEM AND METHOD FOR SIMULATING HUMAN MANUAL INPUT FOR DEVICES USING CAPACITIVE TOUCHSCREENS

RELATED APPLICATIONS

The present application is a continuation application of U.S. patent application Ser. No. 16/030,767, filed Jul. 9, 2018, and entitled "SYSTEM AND METHOD FOR SIMULATING HUMAN MANUAL INPUT FOR DEVICES USING CAPACITIVE TOUCHSCREENS", which is a continuation application of U.S. patent application Ser. No. 15/374,936, filed Dec. 9, 2016, issued as U.S. Pat. No. 10,019,092 on Jul. 10, 2018, and entitled "SYSTEM AND METHOD FOR SIMULATING HUMAN MANUAL INPUT FOR DEVICES USING CAPACITIVE TOUCHSCREENS", which claims the benefit of the filing date of Prov. U.S. Pat. App. Ser. No. 62/265,902, filed on Dec. 10, 2015, the entire disclosures of which applications are hereby incorporated herein by reference.

COPYRIGHT NOTICE

This application includes material that may be subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND

Currently, when a large number of phones or other devices are returned or exchanged, manual handling of the devices is often required. Organizations handling the returns may be required to execute a series of actions (e.g., touch events) such as unlocking the device, opening certain applications, filling in forms, configuring settings, etc. Currently, many organizations rely on human operators to follow a "script" that defines what actions to take. Such approaches are time consuming, require a one-to-one correspondence between humans and devices, and are subject to human error. Additionally, operating systems and application software often require manual input that cannot be automated for security reasons. In large volumes, the costs associated with these techniques can increase exponentially.

Other techniques to address the problem of requiring human input rely on mechanical devices that simulate human fingers. These devices, such as the SR SCARA Pro robot designed by Sastra Robotics of Kochi, India, generally include a robotic arm that manually touches a touchscreen device and, quite literally, mimics a human touching a device. These systems however suffer from the deficiencies of all mechanical systems in that the systems are vulnerable to equipment and component failures. Considering the speed and frequency of movements in such systems, such failures happen frequently.

Thus, there is a need in the current state of the art to simulate manual touch on devices such as phones, tablets, phablets etc., without requiring little or no moving parts.

BRIEF SUMMARY

To remedy the aforementioned deficiencies, the disclosure presents systems, methods, and devices for simulating human manual input for devices using capacitive touchscreens.

In some embodiments, a system may simulate a human user touching the screen of a device, such as a cell phone or similar, that has a capacitive touch screen, with the device positioned on a touch simulator that has a matrix of individually addressable, electric structures based on a matrix of individually addressable, XY resolved electric structures based on inflatable tubes an LCD display. A camera may photograph the device screen and transmit the resulting images to a computer, where the interactions of the touch simulator and the device are recorded. Additionally, software on a computer can create scripts for future, similar interactions, using the stored images to test similar devices for functionality.

In one embodiment, the system activates an icon on a device screen, using a cross-hatching of tubes. In this embodiment, rubber tubes with a slightly conductive coating are inflated. Only when two perpendicular tubes inflate does the area at the junction of the two tubes expand enough to touch the device screen. Thus when, at the junction of two inflated tubes, the upper tube touches the screen, it simulates the touch of a user. The tubes may create matrix and at the edges of matrix may be inlet valves. These valves connect to inlet chambers and, respectively, chambers are fed by a fan. By controlling the air feed into specific valves of inlet valves, one or more matrix points may be inflated so the selected points expand enough to touch the screen with the slightly conductive rubber, thus simulating a user touch. In alternative embodiments, using reduced-flow bleed valves on the opposing ends of the tubes would enable the tubes to inflate quickly, but also deflate once the inlet valve is closed. Adjusting the ratio of cross-section between inlet and bleed valves could achieve an optimum balance between speed of inflation and deflation. The problem with this approach is that it would be more difficult than the approach described infra to simulate a workable sliding motion, and achieving a workable the resolution would be difficult. Also, it would be more difficult to achieve enough transparency with those tubes so the screen can be observed to see what's happening where and be responsive to software input. However, software on the computer controlling the matrix could be used to compensate for the sliding difficulties by trying a "soft transition" between matrix points and by erasing/compensating for much of the visual distortion created by the un-transparence of the matrix, thus reducing somewhat the disadvantages.

In one embodiment, a phone, tablet, phablet, or similar device, which is under test, sits with its display screen facing down atop a test fixture. Test fixture may be topped by a shield, made, for example, of a transparent material such as glass or polymer. Underneath is mounted a tube-based matrix (discussed supra), transparent LCD unit (discussed infra) or similar unit, which can simulate a user's finger moving on the display of device. A camera may have a wide-angle lens that can take in the whole display area. A shield may have various different placement markings for various different devices, so an operator knows where to position each type of device so the display is in the view field of the camera. Thus the camera can view and capture what is happening on the display of device. Computer, using software, can manipulate functions on display to simulate user touches on the display of device. Most devices use capacitive touchscreens, therefore, it is important that the shield be very thin, to allow the touchscreen to sense the activities of the tube matrix or LCD. In one embodiment, an LCD is stripped of all accessory or unnecessary features, with no polarizers or other extra features; it is just two panels in series. Even the LCD itself is not necessary; only the active thin-film transistor (TFT) portion that enables changes in an electric field is used in this approach. These changes are used to simulate the touch of a human finger (or several fingers). Typically dozens of pixels are activated to represent one finger. A device is able to detect the change in the field and can be used to simulate a finger touch by moving the active area; i.e., making the display "think" it creates a visible image. However, an image (e.g., on LCD) is not actually visible. Because the polarizers have been removed, the LCD simulates a finger touch. A computer, typically, may have a display, keyboard, and a pointing device. It may be connected to a network and/or to tablet through a wireless connection. Tablet may have software that displays images from camera, in this case, the image of device as image or outline on the tablet display. Software is typically used only to set up (and record) new procedures for new software on device under test (DUT). In this example an icon on the display of device appears as an icon on the tablet within an outline of the DUT. The operator may now choose from the icons what functions he wants to perform on image; that is, for example, he can touch an icon to perform a slide, single-tap, double-tap, multi-tap, squeeze, stretch, etc. Although a tablet is discussed herein, the same functions may be performed on a screen connected to computer, directly or indirectly, using mouse and keyboard, or using a touchscreen or other, similar apparatus or input device. The computer records and/or stores any functions and following steps, etc. as well as transmitting them to the tube matrix or LCD, which then simulates the use of a finger function on device. In this manner, an entire script of operations for a specific type and model of device with its specific software can be created on the tablet and used to test every device of that type. Further, such a test script may be run at variable speeds, that is, real-time speed, faster, slower, etc. Once a set of scripts is created, any script can be recalled from the keyboard, or even by the computer just by recognizing the device plugged in, and the whole sequence can be played back without any human interaction. In some cases, the camera can recognize (based on certain previously made selections during creation of scripts) that additional input is necessary, such as adding a password, etc. and typing that into the screen-based keyboard on device.

Also disclosed is an exemplary stripped LCD, discussed supra. The LCD has glass, tabs, driver chips, an LCD controller, connections, video card, and a PCI connector. PCI connector typically plugs into a computer such as a notebook or desktop, depending on the type video card and the bus in the computer. PCI connector may be plugged into a computer such as computer, which may then drive the LCD. Pixels on the LCD display indicate an area of activity applied over an icon on device to activate the icon. By using LCD pixels that have similar resolution to those on the device under testing, smooth motions such as, for example, slides or multi-taps may easily be simulated and applied to the device.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

The present disclosure will now be described more fully hereinafter with reference to the accompanying drawings, which form a part hereof, and which show, by way of illustration, certain example embodiments.

In the illustrated embodiments, a system simulates a human user touching the screen of a device that has a capacitive touchscreen, with the device positioned on a touch simulator that has a matrix of individually addressable, XY resolved electric structures based on inflatable tubes. In such a system, a camera may photograph the device screen and transmit the resulting images to a computer, where the interactions of the touch simulator and the device are recorded. Additionally, software on a computer can create scripts for future, similar interactions, using the stored images to test similar devices for functionality. Alternatively, the system may simulate human touch on the device screen through a matrix of individually addressable, electric structures based on an LCD display.

FIGS. 1A through 1D are diagrams of tube-based systems for simulating human input according to some embodiments of the disclosure.

As illustrated in FIGS. 1A through 1D, systems 100a-d include two layers of rubber tubes 102a-e and 104a-c. In one embodiment, rubber tubes 102a-e and 104a-c comprise rubber tubes having a slightly conductive coating. In the illustrated embodiment, the rubber tubes may be inflated and deflating using air supplied by a fan or other device.

In the illustrated embodiment, the two layers of rubber tubes 102a-e and 104a-c form a matrix of individually addressable electric structures in the form of tubing with junctions forming between the two layers, such as junction 114. As described in more detail herein, when two perpendicular tubes are inflated, the junction between the two tubes increases in height and thus protrudes from the plane formed by tubes 102a-e and 104a-c. In one embodiment, the plane formed by tubes 102a-e and 104a-c may be placed a predefined distance from a capacitive touchscreen such that the tubes 102a-e and 104a-c do not touch the touchscreen when uninflated (or are a suitable distance away to prevent conductivity between the tubes 102a-e and 104a-c and the touchscreen). Upon inflation, a junction (e.g., 114) may expand vertically and come within a predefined distance of the touchscreen, or may touch the touchscreen. In one embodiment, the tubes 102a-e and 104a-c may be connected to an electricity source and thus may conduct electricity. Upon a junction 114 rising and meeting a touchscreen, electricity is transferred between the junction 114 and the touchscreen, thus simulating a touch event at the junction 114.

Figure 1A:
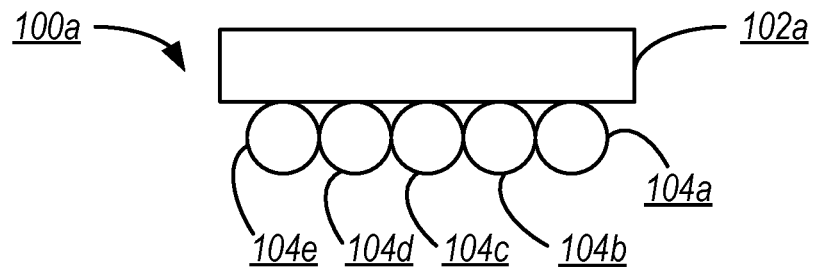
FIGS. 1A through 1D are diagrams of tube-based systems for simulating human input according to some embodiments of the disclosure.
Figure 1B:
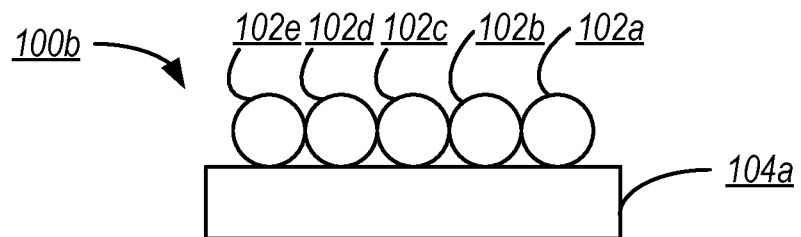
Figure 1C:
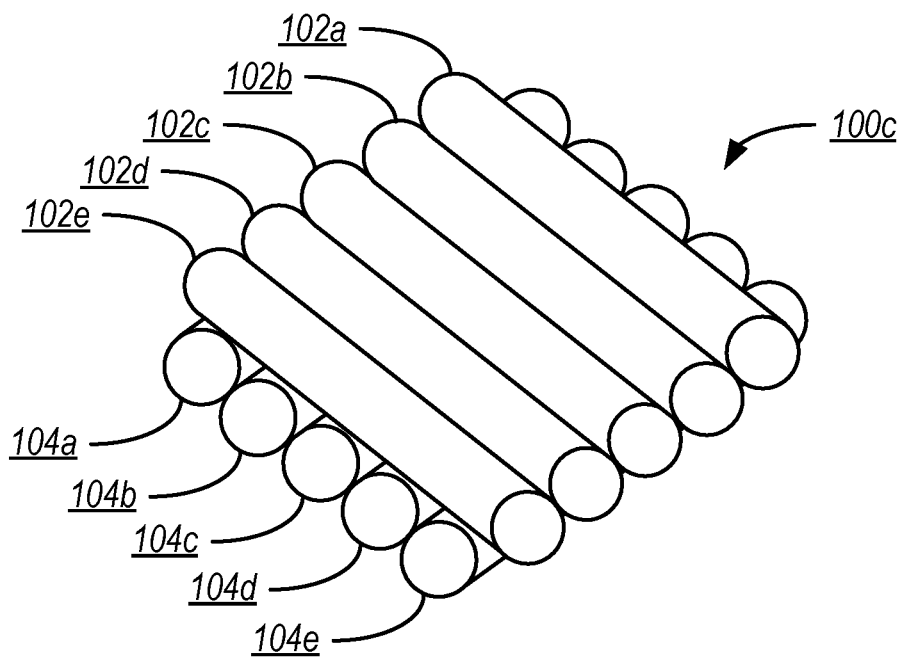
Figure 1D:
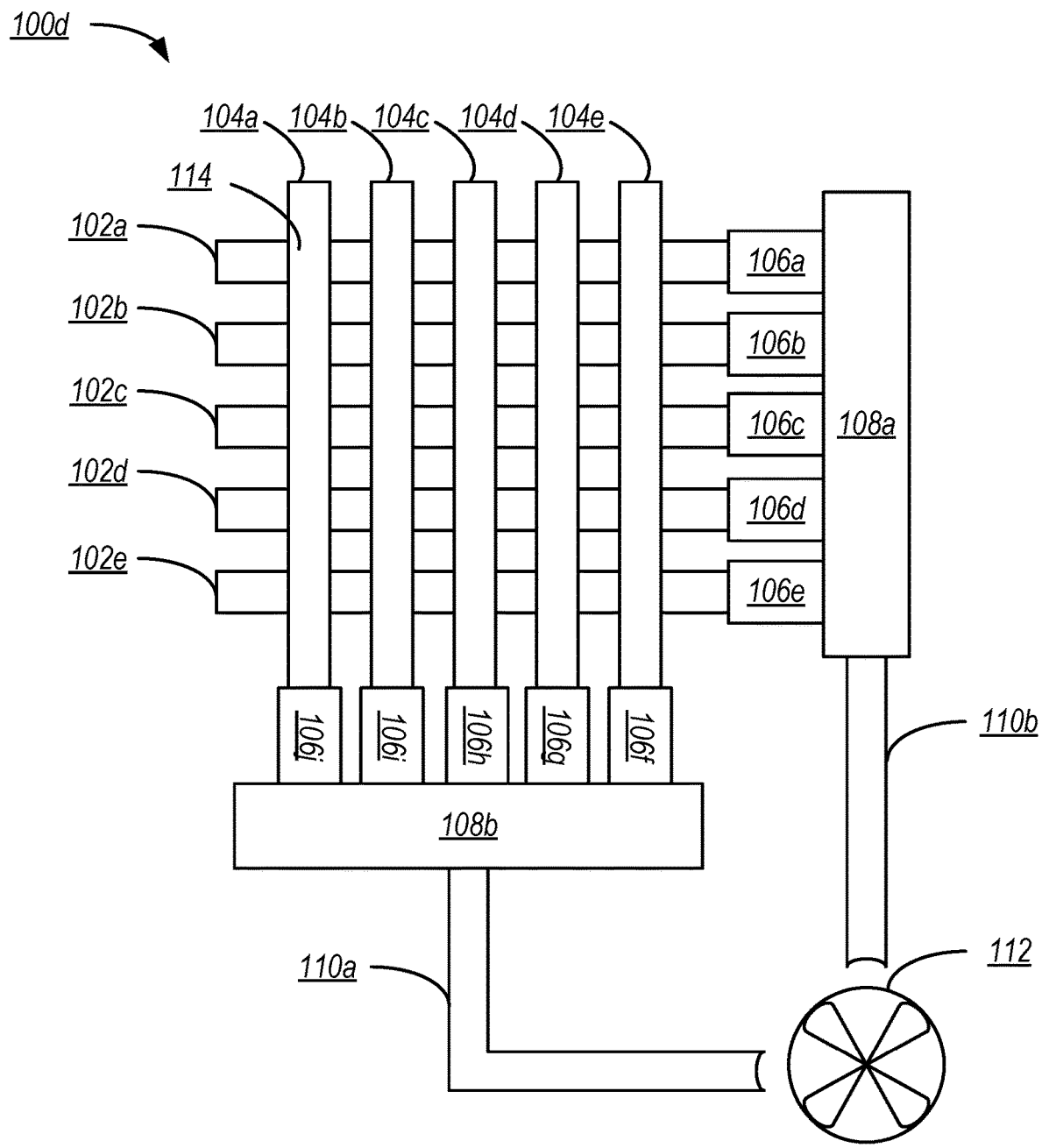

As illustrated in more detail in FIG. 1D, inlet valves 106*a-e* and 106*f-j* may be connected to tubes 102*a-e* and 104*a-c*, respectively. In the illustrated embodiment, inlet vales 106*a-j* control the flow of air into tubes 102*a-e* and 104*a-c*. In one embodiment, inlet vales 106*a-j* may comprise reduced-flow bleed valves.

Inlet valves 106*a-j* are connected to chambers 108*a-b*, and chambers 108*a-b* are connected to a fan 112 via channels 110*a-b* and to tubes 102*a-e* and 104*a-c* via inlet valves 106*a-e* and 106*f-j*. In one embodiment, a fan source 112 may supply a constant stream of air flow buffered by chambers 108*a-b* (e.g., via an exhaust valve). In one embodiment, input valves 106*a-j* may be controlled via software running on a workstation (not illustrated). By controlling the air feed into specific valves of inlet valves 106*a-j*, one or more junctions (e.g., junction 114) may be inflated so the selected points expand enough to touch the screen with the slightly conductive rubber, thus simulating a user touch. Conductivity is such as to simulate the touch of human skin, so that skin sensors will recognize the rubber as skin touch.

In alternative embodiments, the system 100*d* may additionally include reduced-flow bleed valves (not illustrated) on the opposing ends of the tubes 102*a-e* and 104*a-c*. Use of reduced-flow bleed valves enables the tubes 102*a-e* and 104*a-c* to inflate quickly, but also deflate once the inlet valves 106*a-j* are closed. Adjusting the ratio of cross-section between inlet 106*a-j* and bleed valves achieves an optimum balance between speed of inflation and deflation. In alternative embodiments, valves may be configured as positive or negative flow valves.

In one embodiment, the systems 100*a-d* may utilize software on a workstation to controller the matrix of tubes 102*a-e* and 104*a-c* and compensate for difficulties in performing certain touch events, such as "swipes" or "slides." In this embodiment, the software may perform a soft transition between junctions in order to compensate for the delay caused by the physical nature of the systems 100*a-d*. In another embodiment, the systems 100*a-d* may utilize software to compensate for any distortions in video captured through tubes 102*a-e* and 104*a-c*. Specifically, in one embodiment, tubes 102*a-e* and 104*a-c* may be formed of a clear material but may still degrade the video captured of the device under test. In this embodiment, software may perform various image processing operations in order to compensate for any distortions caused by the lack of complete transparency of the tubes 102*a-e* and 104*a-c*. For example, software may perform operations to detect borders of objects and may utilize a catalog of device characteristics (e.g., known object shapes) in order to "rebuild" the user interface in spite of distortion.

In alternative embodiments, the systems 100*a-d* may include a plurality of inflatable "pillows" forming a matrix of inflatable pillows in contrast to a matrix of intersecting tubes. In these embodiments, each inflatable pillow may be of a predefined area which may be configured based on the device or needs of the operator. In one embodiment, an inflatable pillow may be configured to be a similar area to that of a human finger. In these embodiments, each pillow may be coupled to an inlet valve and/or bleed valve in order to control the inflation of each pillow. As discussed previously, each pillow may be coated with an electrically conductive coating in order to simulate human touch events.

Figure 2:
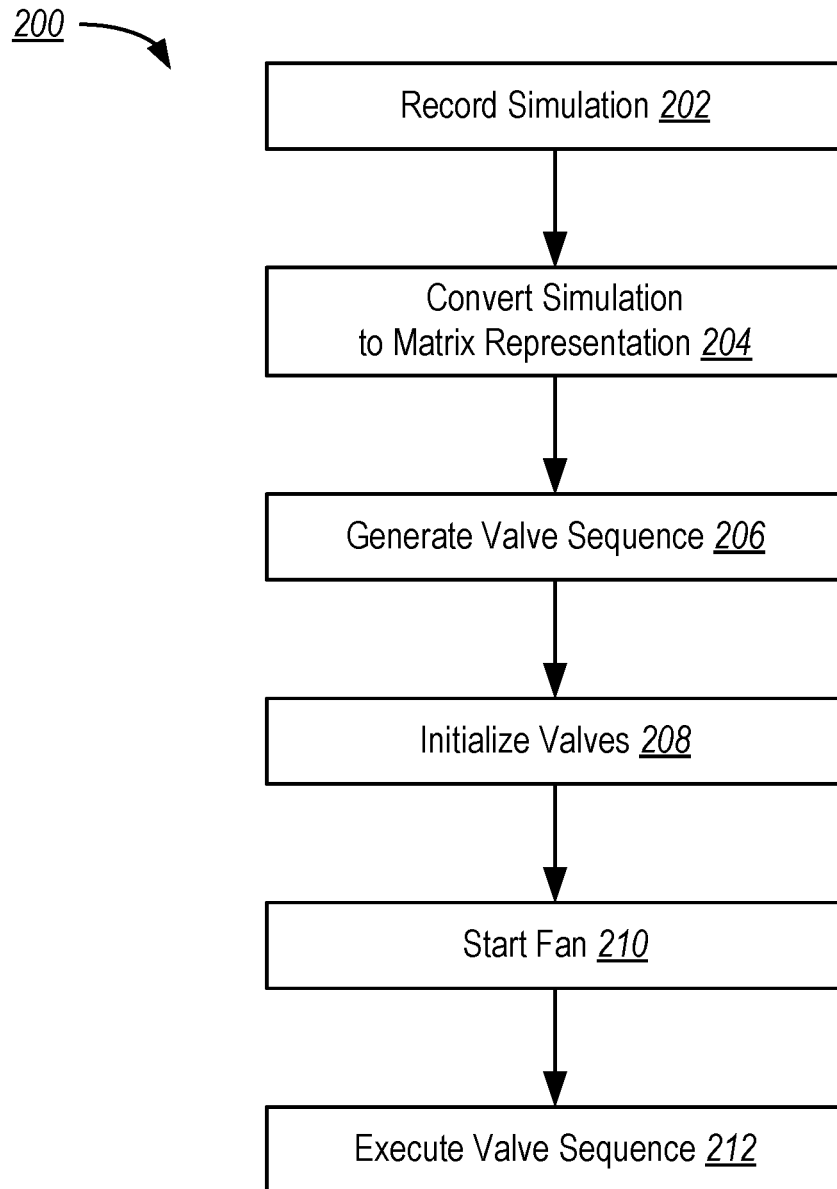
FIG. 2 is a flow diagram illustrating a method for simulating human input using a matrix of conducting tubes according to some embodiments of the disclosure.

FIG. 2 is a flow diagram illustrating a method for simulating human input using a matrix of conducting tubes according to some embodiments of the disclosure.

In step 202, the method 200 records a simulation. In one embodiment, recording a simulation may comprise recording touch events on a touchscreen that simulates a device under test as described in connection with FIG. 7.

In step 204, the method 200 converts the simulation to a matrix representation. As described previously, a simulation may include a plurality of touch events and the locations (e.g., X/Y coordinates) of those touch events. In order to convert the coordinates and event types to a matrix representation the method 200 first calculates a tube inflation level corresponding to the event (e.g., depending on the force of the event) and then converts the coordinates of the event to one or more tube junctions present within the matrix as illustrated in FIGS. 1A through 1D. If the event has a duration, the method 200 additionally repeats the conversion for each time series event. In this manner, the method 200 creates a time series of tube junction identifiers and inflation levels.

In step 206, the method 200 generates a valve sequence based on the matrix representation, the valve sequence controlling the air flow into a tube connected to the valves. In one embodiment, a valve sequence may comprise a time series that defines the opening and closing of specific valves controlling the matrix of tubes illustrated in FIG. 1A-D. Alternatively, or in conjunction with the foregoing, the time series may also include a valve opening amount for each time series entry, thus controlling the amount of air flow through the valve.

In step 208, the method 200 initializes the valves associated with the matrix of tubes. In one embodiment, initializing the valves may comprise closing all valves. Alternatively, initializing the valves may comprise opening or closing valves depending on the desired initial state of the test fixture.

In step 210, the method 200 starts the fan connected to the test fixture and then, in step 212, executes the valve sequence. In one embodiment, executing a valve sequence may comprise transmitting a signal to each valve indicating the amount the valve should be opened or close at any given moment in time. By opening and closing the valves, the method 200 corresponding inflates and deletes the tubes connected to each valve and thus inflates the intersection of tubes to simulate human contact. Thus, by executing the valve sequence, the method 200 transmits touch events to a devise under test based on the recorded simulation. In alternative embodiments, the method 200 may additionally include a step of executing one or more pre-loaded software applications on the mobile device (e.g., in response to a user touch event). In these embodiments, the pre-loaded software may be configured to execute a predefined set of actions where touch is not required.

Figure 3:
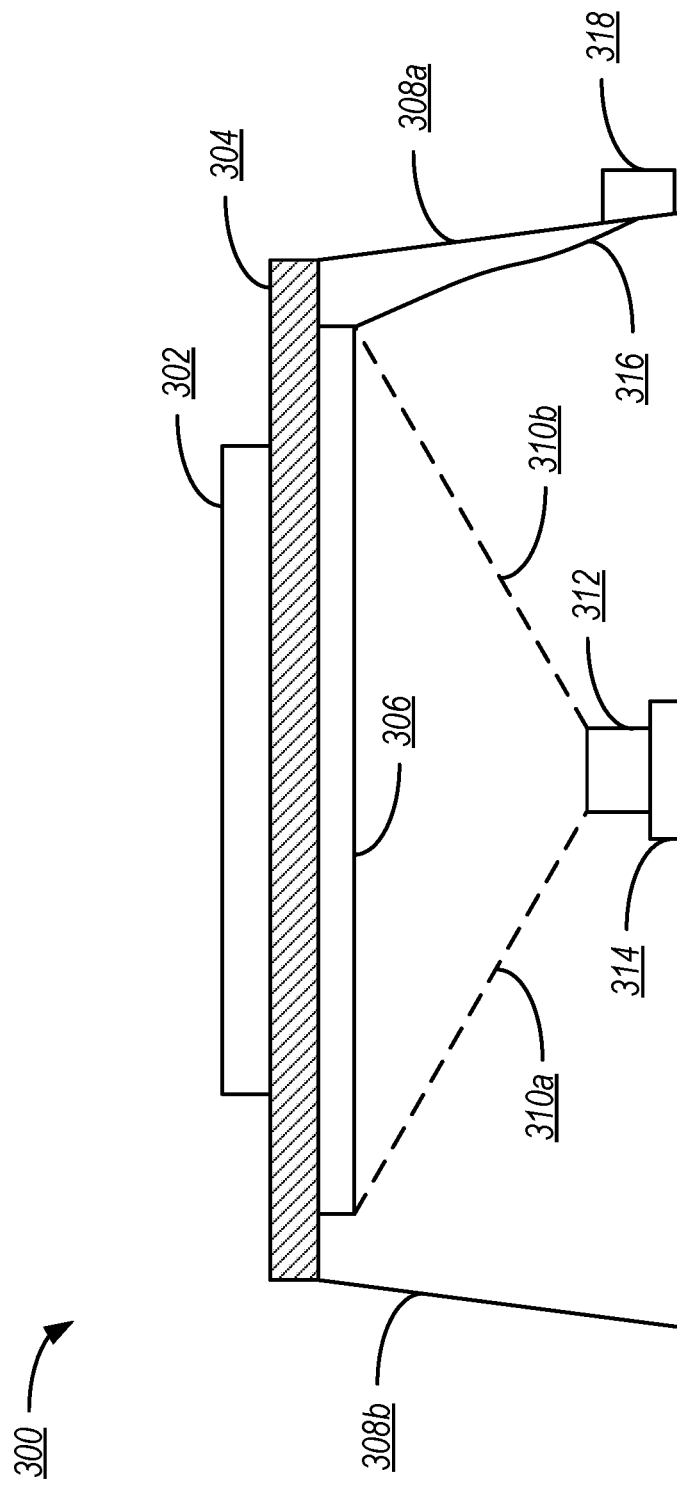
FIG. 3 is a diagram of a test fixture according to some embodiments of the disclosure.

FIG. 3 is a diagram of a test fixture according to some embodiments of the disclosure.

As illustrated in FIG. 3, a device 302 is placed on top of a test fixture 300. In one embodiment, device 302 may comprise a phone, tablet, phablet, or similar device having a capacitive touchscreen interface. In the illustrated embodiment, device 302 may be placed "face down" such that the capacitive touchscreen is flush with the top side test fixture 300. In the illustrated embodiment, the top side of test fixture may be of any size suitably larger than the device 302 so as to encompass the entire touchscreen of device 302.

In some embodiments, test fixture 300 may include a shield 304 located on the top side of the test fixture 300. In one embodiment, shield 304 comprises a thin, transparent or translucent layer separating the device 302 from LCD unit 306. In one embodiment, shield 304 may be made of glass or polymer. In some embodiments, shield 304 may be permanently fixed to the sidewalls 308a, b of test fixture 300. Although illustrated at an angle, sidewalls 308a-b may additionally be vertical supports. Notably, shield 304 may be sufficiently thin enough so as to allow the touchscreen to sense the activities of LCD unit 306. In alternative embodiments, a matrix of tubes (as discussed in connection with FIG. 1) may be utilized in place of LCD unit 306. In these embodiments, the physical touching of intersections of tubes may be made with shield 304 and thus manipulate a screen of a device under test. In some embodiments, shield 304 may include one or more openings to allow for human contact. For example, a mobile device may include one or more elements (e.g., a "home" button) that requires human skin to function (e.g., by requiring a thumbprint or similar skin-based requirement). In these embodiments, shield 304 may be device-specific and may include an opening on those portions of the device that require contact with human skin.

Test fixture 300 additionally includes a matrix of individually addressable electric structures in the form of a transparent LCD unit 306. As discussed in more detail, LCD unit 306 may be sufficiently transparent to allow for light from device 302 to pass through shield 304 and into the body of test fixture 300 with minimal or no distortion. In the illustrated embodiment, LCD unit 306 is configured to simulate a user's finger moving on the display of device 302. In one embodiment, LCD unit 306 may be fixedly mounted to shield 304. Alternatively, or in conjunction with the foregoing, LCD unit 306 may be fixedly mounted to one of sidewalls 308a-b and placed flush with shield 304. Operation of the LCD unit 306 is described in more detail with respect to FIGS. 4 and 5, the disclosure of which is incorporated herein by reference in its entirety. In one embodiment, LCD unit 306 may include two layers of active thin-film transistors arranged in a matrix.

Test fixture 300 additionally includes a camera 314 having a wide-angle lens 312. In the illustrated embodiment, the camera 314 and lens 312 may be configured to capture the entirety of the touchscreen of device 302. As illustrated in FIG. 3, lens 312 may be selected such the field of view (represented by lines 310a-b) is broad enough to capture the entirety of the touchscreen of device 302 or larger.

In some embodiments, shield 304 may include one or more markings associated with various sizes of a device 302. For example, shield 304 may include four "L"-shaped markers representing the four corners of various devices. In this manner, shield 304 allows for the proper positioning of device 302 such that the touchscreen of the device is located entirely within the field of view of camera 314.

Test fixture 300 additionally includes an input/output ("I/O") port 318. I/O port 318 allows for the transmission of data to and from camera 314 and LCD unit 316, as described in more detail with respect to FIGS. 4 and 5. In the illustrated embodiment, LCD unit 306 may be connected to I/O port 318 via connection 316, thus allowing for communication with a workstation or other device as described more fully in connection with FIG. 5.

Figure 4:
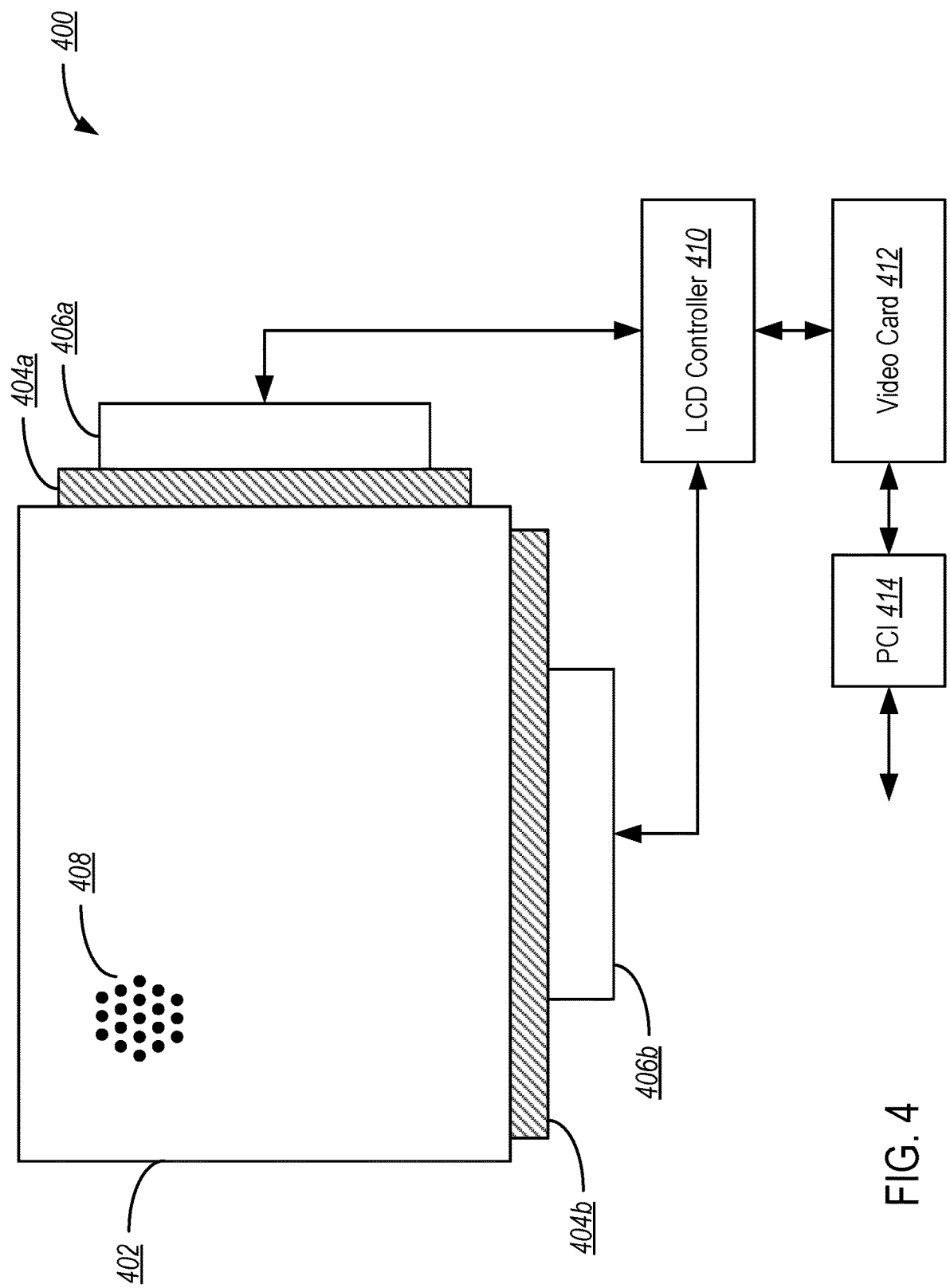
FIG. 4 is a block diagram of a system for simulating human input according to some embodiments of the disclosure.

FIG. 4 is a block diagram of a system for simulating human input according to some embodiments of the disclosure. As illustrated in FIG. 4, a system 400 includes a glass panel 402, tabs 404a-b, driver chips 406a-b, LCD controller 410, video card 412, and PCI connector 414.

In one embodiment, glass panel 402 may comprise a planer sheet of active thin-film transistor (TFT) glass. Generally, a standard TFT LCD display consists of multiple layers. In a standard LCD display a sheet of TFT glass is surrounded by one or more color filter glasses and one or more polarizers. In the illustrated embodiment, glass panel 402 may comprise only the TFT glass layer of a traditional LCD display. By using only the TFT glass layer, the system allows for full transparency while allow for the conduction of electricity using the TFTs present within the glass panel.

In one embodiment, glass panel 402 may comprise two TFT panels in series. In one embodiment, glass panel 402 may additionally be coupled to a liquid crystal display; however, in alternative embodiments a liquid crystal display is not necessary. A liquid crystal display may not be necessary as only the active TFT layer that enables changes in an electric field is used in the illustrated embodiment. These changes are used to simulate the touch of a human finger (or several fingers).

Illustrated on glass panel 402 are multiple, active pixels 408. Although illustrated as darkened circles, in practice, active pixels 408 would be invisible in operation due to the lack of color filters installed over the TFT glass. Active pixels 408 indicate an area activity applied, for example, over an icon on a device under test that, in turn, activates the icon. By using LCD pixels that have similar resolution to those on the device under test, smooth motions such as slides or multi-taps may easily be simulated and applied to the device.

Generally, dozens of pixels are activated to represent a single finger. A test fixture is able to detect the change in the electrical field of glass panel 402 and the change be used to simulate a finger touch by moving the active area; i.e., making the display "think" it creates a visible image. However, an image (on glass panel 402) is not actually visible as the polarizers of the LCD have been removed. Thus, the glass panel 402 of the LCD may simulate finger touches without displaying visual content.

Glass panel 402 may be connected to one or more tabs 404a-b. Tabs 404a-b may allow for the positioning and retention of glass panel 402 within a test fixture. Additionally coupled to glass panel 402 are driver chips 406a-b. In one embodiment, a driver chip may comprise a solid-state active or passive electronic device that allows for the manipulation of transistors within glass panel 402. In the illustrated embodiment, the system 400 includes two driver chips 406a-b in order to control a horizontal and vertical set of transistors present within glass panel 402.

Driver chips 406a-b are communicatively connected to an LCD controller 410. In one embodiment, LCD controller 410 comprises a solid state device designed to convert instructions to signals for driver chips 406a-b. In alternative embodiments, LCD controller 410 and driver chips 406a-b may be collocated or may comprise a single chip. In one embodiment, LCD controller 410 may be configured with an image processor designed to convert bitmap images into instructions for driver chips 406a-b. As illustrated in FIG. 4, the system 400 may further include a video card 412 designed to receive video data from a computer via PCI connector 414 and transmit video content to LCD controller 410.

The system 400 additionally includes a PCI connection 214. PCI connector 414 typically plugs into a computer such as a notebook or desktop, depending on the type of video card 412 and bus in the computer. PCI connector 414 may be plugged into a computer which may then drive the glass panel 402 via LCD controller 410.

Figure 5:
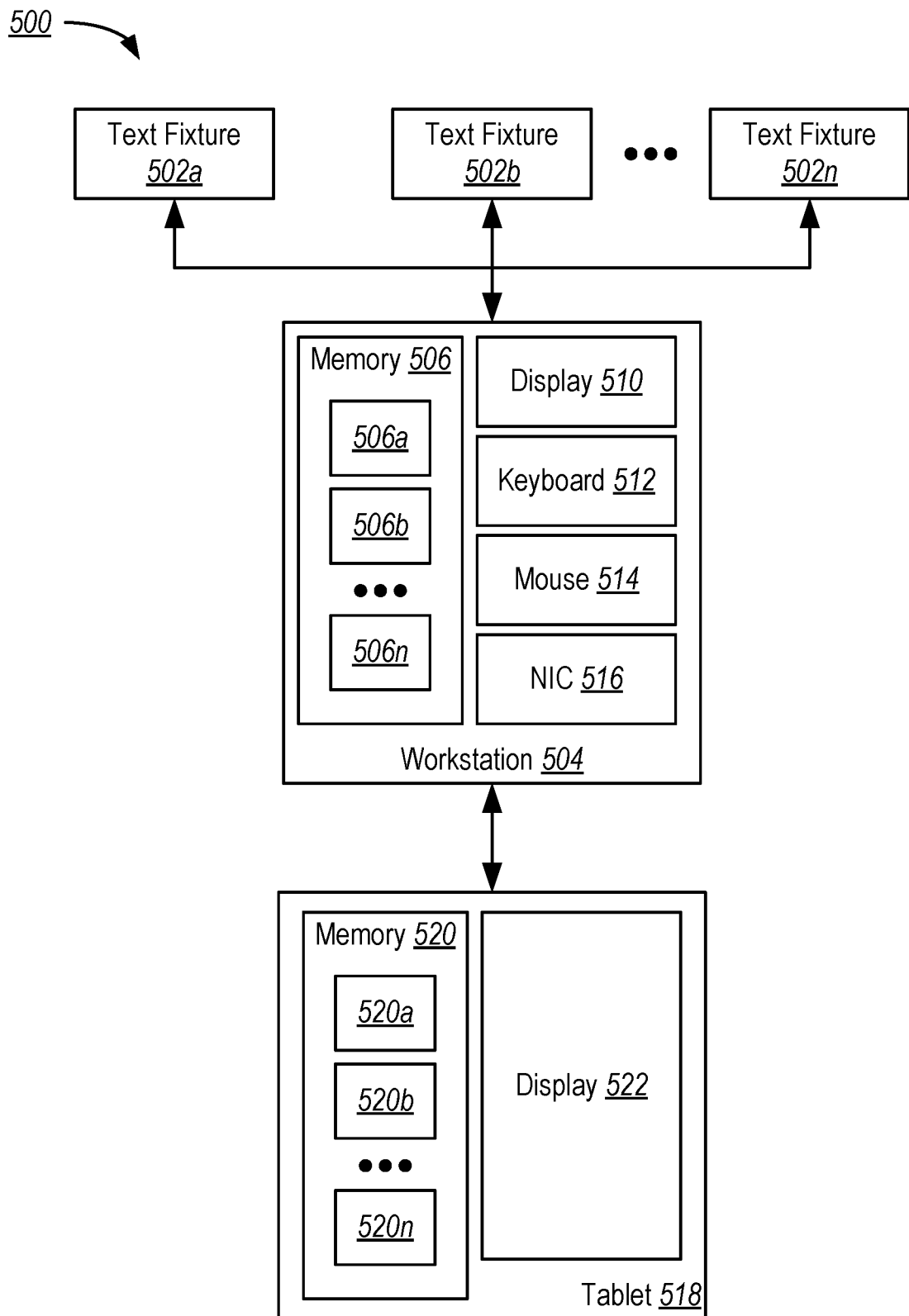
FIG. 5 is a block diagram of a system for simulating human input using a simulated device according to some embodiments of the disclosure.

FIG. 5 is a block diagram of a system for simulating human input using a simulated device according to some embodiments of the disclosure.

As illustrated in FIG. 5, test fixtures 502a-n are communicatively coupled to workstation 504. In one embodiment, each test fixture 502a-n may comprise a test fixture as described in connection with FIGS. 3 and 4, the disclosure of which is incorporated herein by reference in its entirety. In some embodiments, text fixtures 502a-n may include a tube-based or LCD-based test fixture.

Workstation 504 may comprise a memory 506 storing applications 506a-n. Memory 506 may comprise any type of volatile memory device such as RAM, SRAM, DRAM, etc. In one embodiment, applications 506a-n may provide for the manipulation of an LCD display present within test fixtures 502a-n. For example, applications 506a-n may allow for the storage and retrieval of operations stored in long-term storage (not illustrated). Additionally, applications 506a-n may allow for the editing of operations as well as the transmission of operations to test fixtures 502a-n. In one embodiment, workstation 504 may record operations received from tablet 518 as discussed more fully herein.

Workstation 504 additionally includes a display 510 (e.g., a CRT or LCD monitor or similar display), a keyboard 512, mouse 514, and network interface (NIC) card 516. In one embodiment, NIC card 516 may comprise an electronic device enabling network connections with other devices such as test fixtures 502a-n or tablet 518. In one embodiment, NIC card 516 may provide wireless or wired network connectivity.

Tablet 518 may comprise a tablet computer, phablet computer, mobile phone or other portable device having a touchscreen display. As illustrated, tablet 518 includes a display 522 which comprises a touchscreen display and memory 520 which is configured to store one or more applications 520a-n. Operation of tablet 518 and functions performed by applications 520a-n are described more fully in connection with FIG. 6, the disclosure of which is incorporated herein in its entirety.

As illustrated above, an entire script of operations for a specific type and model of device with its specific software can be created on tablet 518 and used to test every device of that type. Further, such a test script may be run at variable speeds, that is, real-time speed, faster, slower, etc. Once a set of scripts is created, any script can be recalled from the keyboard 512, or even by the workstation 504, just by recognizing the device under test after connected. In one embodiment, the whole script of operations can be played back without any human interaction. In some cases, the camera within a test fixture 502a-n can recognize (based on certain previously made selections during creation of scripts) that additional input is necessary, such as adding a password, etc., and an operator may type the required information into the screen-based keyboard on the device under test or view keyboard 512.

Figure 6:
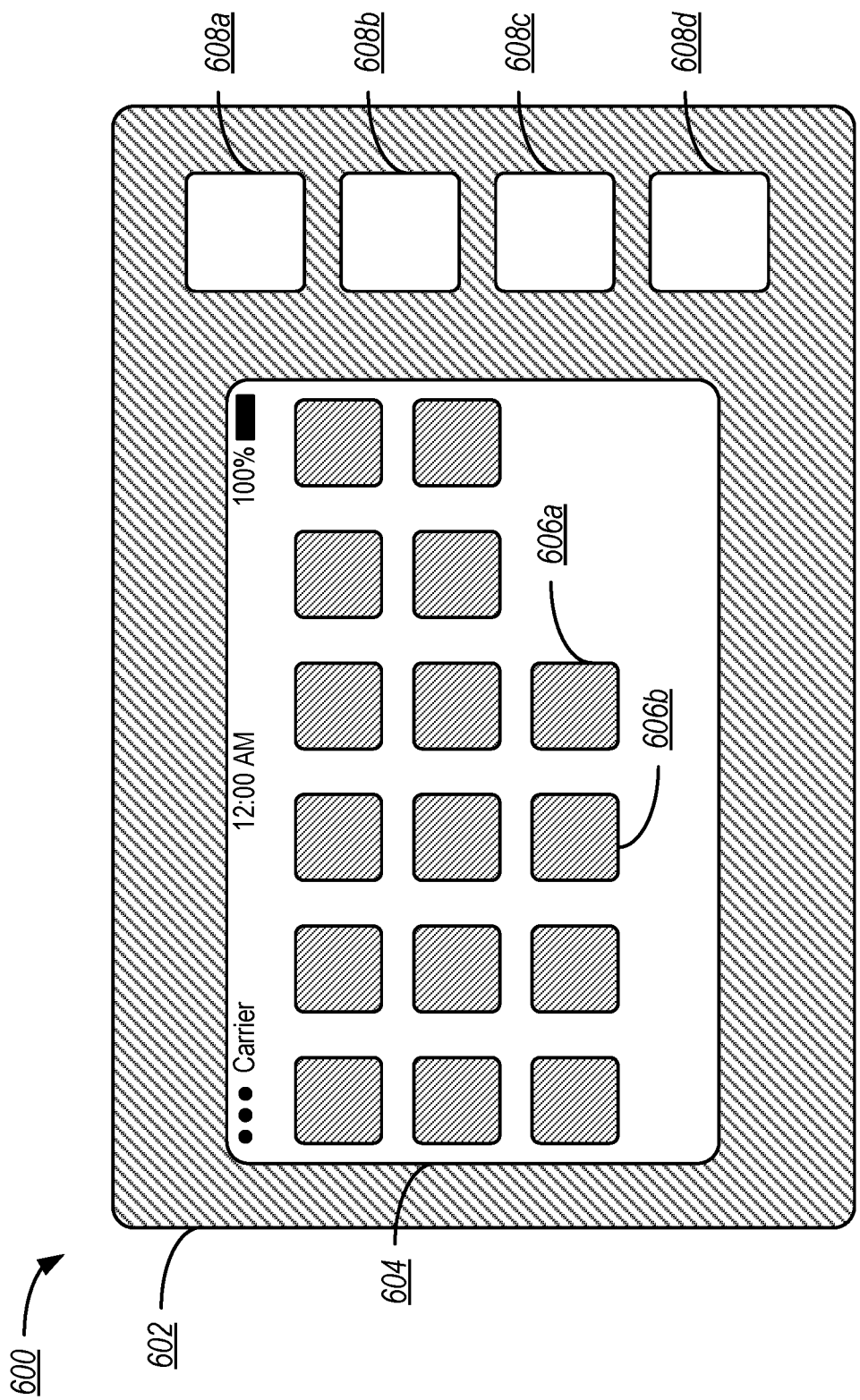
FIG. 6 is a diagram illustrating a user interface for simulating human input according to some embodiments of the disclosure.

FIG. 6 is a diagram illustrating a user interface for simulating human input according to some embodiments of the disclosure.

As illustrated in FIG. 6, a tablet device 600 includes a display area 602 capable of displaying one or more currently running applications. In the illustrated embodiment, display area 602 illustrates an application that includes a depiction 604 of a device and a plurality of operation icons 608a-d.

In the illustrated embodiment, depiction 604 may be generated based on data received from a camera placed within a test fixture such as the fixture illustrated in FIG. 3. For example, an application running in display area 602 may include a portion of the display that presents video received from a camera. In one embodiment, the video includes video frames capturing the touchscreen of a device under test. In this manner, device 600 reproduces the visual display of a touchscreen of a device under test as depiction 604.

Notably, depiction 604 includes an exact, or approximation, of the user interface displayed on a device under test including a title bar having the time and battery percentage, as well as multiple icons 606a-b. In the illustrated embodiment, the icons 606a-b may correspond to the application launcher icons present on the "home" screen of a mobile device.

Device 600 additionally includes software icons 608a-d. In the illustrated embodiment, icons 608a-d may correspond to various applications capable of being executed on the device 600, and separate from the applications on a device under test. Icons 608a-d may provide access for numerous features discussed in further detail herein. For example, icons 608a-d may allow for the initialization of the camera and device under test, the recording of procedures, the playback of procedures, editing of procedures, and other functionality.

One non-limiting example of the operation of device 600 is provided herein. In this example, a user of device 600 may choose from icons 608a-d what functions he or she intends to perform on depiction 604. In one embodiment, the user may select icon 608a to initialize the camera and begin the display of a device under test as depiction 604. After initialization, the user may select icon 608B to being a recording function allowing for the recordation of one or more operations to be performed within depiction 604. For example, operations to perform on depiction 604 may include one of a single-tap, double-tap, multi-tap, squeeze, stretch, or other gesture.

After completing the operation (or sequence of operations), the user may select icon 608c to save the recorded operations to memory or disk. Alternatively, the user may select icon 608c to playback the operations. Prior to playing back the operations, the user may select another icon to reset the device under test to a known state. Finally, the user may also utilize icon 608d to enter an editing state wherein the user can manipulate one or more operations recorded previously. For example, the user may speed up or slow down various operations based on determining that an operation was performed too quickly or too slowly.

Although a tablet device 600 is shown here, the same functions may be performed on a screen connected to computer, directly or indirectly, using mouse and keyboard, or using a touchscreen or other, similar apparatus or input device.

Figure 7:
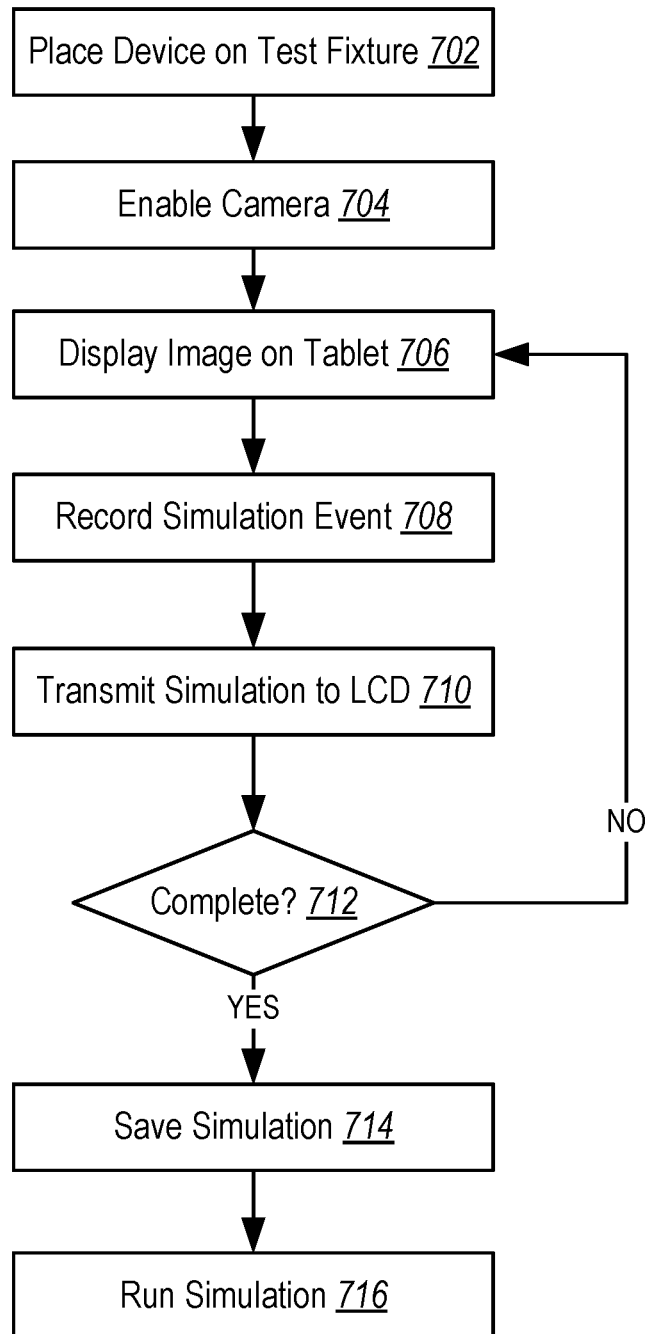
FIG. 7 is a flow diagram illustrating a method for simulating human input according to some embodiments of the disclosure.

FIG. 7 is a flow diagram illustrating a method for simulating human input according to some embodiments of the disclosure.

In step 702, a device under test is placed on a test fixture. As discussed previously, a device under test may be placed on a test fixture with the device's touchscreen facing the test fixture.

In step 704, a camera in the test fixture is enabled. In one embodiment, a camera may automatically be enabled upon detecting that a device under test has been placed on the test fixture. Alternatively, a camera may be enabled upon detecting a connection between the device under test and a workstation.

In step 706, an image of the device under test is displayed on a tablet device. In one embodiment, the camera may record the screen of the device under test and transfer image data of the device under test to a tablet device. In one embodiment, the image data may be transmitted to a tablet device via a workstation.

In step 708, the method 700 records a simulation event. In one embodiment, a simulation may comprise the manipulation of the device under test via the video images displayed on the tablet. That is, the tablet may be configured to receive touch input from a user and translate the touch input on the tablet device to touch input on the device under test using the video image of the screen of the device under test.

In step 710, the method 700 transmits simulation data to the LCD display. In one embodiment, the method 700 may transmit simulation events as recorded to the LCD display which, in turn, performs the simulation events on the device under test. In response, the camera captures the screen of the device under test and transmits the resulting image to the tablet, thus allowing the tablet to reproduce the results of the simulation event. For instance, a user may "tap" an icon on the tablet corresponding to an icon on the device under test. In response, the method 700 stores the "tap" event (including coordinates, tap duration, etc.) and transmits the event to the device under test via a workstation (as discussed in more detail below). In this manner, the method 700 generates a listing of touch events or operations and records these events as a simulation. In one embodiment, a simulation may comprise a form-filing operation. Alternatively, the simulation may comprise operations designed to test the functionality of the device.

The method 700 continues until the simulation is deemed complete in step 712. In this manner, the method 700 continuously transmits simulation events and displays the screen of the device under test on the tablet, mimicking the display of the device under test and allowing a user to view the results of the simulation in real-time.

In step 714, the method 700 saves the simulation. In one embodiment, saving a simulation may comprise generating a final simulation description (e.g., a sequence of touch operations) and transmitting the simulation to a permanent storage location such as a workstation or other networked device.

In step 716, the method 700 runs the simulation. In the illustrated embodiment, running a simulation may comprise transmitting the simulation events to a device under test (or multiple devices under test) at a time subsequent to the recording of the simulation. In this manner, the method 700 allows for a single recording of a simulation and allows for playback of the simulation as desired in the future and for other, similar devices.

The subject matter described above may be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The description presented above is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form.

By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A system comprising:
   a test fixture including a camera for simulating manual input comprising a matrix of individually addressable structures, wherein the matrix of individually addressable structures comprises one of a liquid crystal display (LCD) display or a matrix of conductively coated tubes; and
   a tablet configured to receive images from the camera and display a visual representation of a capacitive touchscreen of a device under test, wherein the tablet is configured to generate a simulation of touch events representing interaction with the device under test by:
      recording a simulation of one or more touch events on a touchscreen that simulates touching the device under test; and
      generating, from the simulation, a matrix representation including a plurality of touch events, the matrix representation executable by the test fixture for simulating the one or more touch events.

2. The system of claim 1, wherein the LCD display comprises two layers of thin-film transistors.

3. The system of claim 1, wherein the test fixture further comprises a shield layer comprising a transparent material.

4. The system of claim 3, wherein the transparent material comprises a glass or polymer material, said shield layer having one or more openings in locations where skin contact is required.

5. The system of claim 1, further comprising:
   a workstation communicatively coupled to the tablet and configured to:
      receive the simulation from the tablet device, and
      transmit the simulation to the test fixture to enable execution of the simulation on one or more additional devices under test.

6. The system of claim 1, wherein the matrix representation includes one or more coordinates associated with each touch event of the plurality of touch events.

7. The system of claim 1, wherein the simulation comprises one of an operation to test a functionality of the device under test or an operation simulating an interaction with a form displayed on the device under test.

8. The system of claim 1, wherein the plurality of touch events are selected from the group consisting of a single-tap, a double-tap, a multi-tap, a squeeze, and a stretch.

9. A method comprising:
   generating, on a tablet, a visual representation of an electronic device placed on a test fixture;
   receiving, by the tablet, a plurality of touch events;
   updating, on the tablet, the visual representation in response to the plurality of touch events;
   generating, at the tablet, a simulation representing one or more interactions with the electronic device, the simulation executable by the test fixture for simulating the one or more interactions;
   transmitting, by the tablet, the simulation to the test fixture for execution.

10. The method of claim 9, wherein generating the visual representation comprises:
    recording, by a camera located in the test fixture, a capacitive touchscreen of the electronic device;
    transmitting, by the test fixture, images of the capacitive touchscreen to the tablet; and
    displaying, on the tablet, the visual representation of the capacitive touchscreen of the electronic device.

11. The method of claim 9, further comprising:
    receiving, at the test fixture, images from a workstation, the images generated based on the simulation; and
    selectively enabling, at the test fixture, one or more transistors within an LCD display.

12. The method of claim 11, wherein receiving a plurality of touch events by the tablet comprises receiving images from the camera via the workstation.

13. The method of claim 9, wherein the simulation comprises an operation to test a functionality of the electronic device.

14. The method of claim 9, wherein the simulation comprises an operation simulating an interaction with a form displayed on the electronic device.

15. A non-transitory computer-readable storage medium for tangibly storing computer program instructions capable of being executed by a computer processor, the computer program instructions defining the steps of:
    generating, on a tablet, a visual representation of an electronic device placed on a test fixture;
    receiving, by the tablet, a plurality of touch events;
    updating, on the tablet, the visual representation in response to the plurality of touch events;
    generating, at the tablet, a simulation representing one or more interactions with the electronic device, the simulation executable by the test fixture for simulating the one or more interactions;
    transmitting, by the tablet, the simulation to the test fixture for execution.

16. The non-transitory computer-readable storage medium of claim 15, wherein generating the visual representation comprises:
    recording, by a camera located in the test fixture, a capacitive touchscreen of the electronic device;

transmitting, by the test fixture, images of the capacitive touchscreen to the tablet; and displaying, on the tablet, the visual representation of the capacitive touchscreen of the electronic device.

17. The non-transitory computer-readable storage medium of claim 15, the computer program instructions further defining the steps of:

receiving, at the test fixture, images from a workstation, the images generated based on the simulation; and selectively enabling, at the test fixture, one or more transistors within an LCD display.

18. The non-transitory computer-readable storage medium of claim 17, wherein receiving a plurality of touch events by the tablet comprises receiving images from the camera via the workstation.

19. The non-transitory computer-readable storage medium of claim 15, wherein the simulation comprises an operation to test a functionality of the electronic device.

20. The non-transitory computer-readable storage medium of claim 15, wherein the simulation comprises an operation simulating an interaction with a form displayed on the electronic device.

\* \* \* \* \*